US009148414B1

(12) United States Patent
Roth et al.

(10) Patent No.: US 9,148,414 B1
(45) Date of Patent: Sep. 29, 2015

(54) CREDENTIAL MANAGEMENT IN A MULTI-TENANT ENVIRONMENT

(71) Applicant: Amazon Technologies, Inc., Reno, NV (US)

(72) Inventors: Gregory Branchek Roth, Seattle, WA (US); Benjamin E. Seidenberg, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 51 days.

(21) Appl. No.: 13/676,811

(22) Filed: Nov. 14, 2012

(51) Int. Cl.
| | |
|---|---|
| G06F 21/00 | (2013.01) |
| H04L 29/06 | (2006.01) |
| H04L 9/32 | (2006.01) |
| G06F 17/40 | (2006.01) |
| G06F 15/16 | (2006.01) |
| G06F 21/30 | (2013.01) |
| G06F 21/64 | (2013.01) |
| H04L 29/08 | (2006.01) |

(52) U.S. Cl.
CPC *H04L 63/08* (2013.01); *H04L 9/32* (2013.01); *G06F 21/305* (2013.01); *G06F 21/64* (2013.01); *G06F 21/645* (2013.01); *H04L 9/3202* (2013.01); *H04L 9/3281* (2013.01); *H04L 63/0407* (2013.01); *H04L 67/125* (2013.01)

(58) Field of Classification Search
CPC ......... H04L 67/125; H04L 9/32; H04L 63/08; G06F 21/64
USPC .................... 726/4, 1, 12; 709/226
See application file for complete search history.

(56) References Cited

U.S. PATENT DOCUMENTS

| | | |
|---|---|---|
| 8,489,701 B2 | 7/2013 | Manion et al. |
| 2006/0141985 A1 | 6/2006 | Patel et al. |
| 2014/0059226 A1* | 2/2014 | Messerli et al. ............. 709/226 |

FOREIGN PATENT DOCUMENTS

WO   WO 2012061434 A1 *  5/2012

OTHER PUBLICATIONS

Bo Tang ; Qi Li ; Sandhu, R.; "A multi-tenant RBAC model for collaborative cloud services"; Privacy, Security and Trust (PST), 2013 Eleventh Annual International Conference on DOI: 10.1109/PST.2013.6596058; Publication Year: Feb. 2013 , pp. 229-238.*
US Non-Final Office Action issued in U.S. Appl. No. 13/676,840 dated Oct. 23, 2014.

* cited by examiner

*Primary Examiner* — Kambiz Zand
*Assistant Examiner* — Courtney Fields
(74) *Attorney, Agent, or Firm* — Hogan Lovells US LLP

(57) ABSTRACT

Customers accessing resources or services in a multi-tenant environment can obtain assurance that a provider of that environment will honor only requests associated with the customer and will reject any requests that might have been tampered with or otherwise falsely generated. Various endpoints or interfaces can be used, which can be located in the multi-tenant environment, in a customer environment, or in a separate location. These endpoints or interfaces can sign unsigned requests, or otherwise increase the credentials of a signed request, on behalf of a customer. In some embodiments, additional metadata can be added that can increase the authentication level of the requests. Such an approach can enable a customer to provide or delegate access to the resources without exposing the credentials outside a secure environment.

26 Claims, 6 Drawing Sheets

CREDENTIAL MANAGEMENT IN A MULTI-TENANT ENVIRONMENT

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A customer typically will rent, lease, or otherwise pay for access to resources through the cloud, such that the customer does not have to purchase and maintain the hardware and/or software to provide access to these resources. A potential disadvantage to such an approach, at least from a customer point of view, is that the resources typically are at a location under control of the provider of those resources, and thus are out of the direct control of the customer. In order to help ensure that resources allocated to the customer perform tasks only under direction of that customer, the provider environment can support request authentication to prevent unauthorized parties from accessing the resources. Customers would like some assurance that the service provider will honor only requests from the customer and will reject any requests that might have been tampered with or otherwise falsely generated.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing aspects of multi-tenant resources in an electronic environment. In particular, various embodiments provide mechanisms for ensuring authorized access to one or more resources in a multi-tenant environment, as well as managing credentials for customers of the multi-tenant environment.

In some embodiments, a virtual private network (VPN) gateway can be utilized to receive and/or intercept requests associated with a customer, such as requests received from a client device associated with the customer or a user having delegated access under a customer account. The VPN gateway can perform tasks such as to sign unsigned requests or add identifying information or other credentials to various requests. Such functionality can allow the requests to be authenticated and processed by resources or services in a multi-tenant environment without the customer having to manage or potentially expose the credentials. The gateway can site between the client and resource endpoints, whether in the customer environment, in the resource environment, or otherwise. Similarly, various interfaces, gateways, or agents can be used to manage credentials in various embodiments. When used in a customer environment, all requests for a customer account can be routed through an agent or interface, which then can enable all the requests to be signed or otherwise include the necessary credentials without providing the credentials to the individual users or devices. When in the resource environment, requests can be directed to a particular interface that can allow the request to be signed or have appropriate credentials added. In some embodiments the interface can be associated with a private cloud or environment of a customer within the multi-tenant environment, and can act with respect to the private environment as an agent in the customer environment. Similarly, a virtual machine manager or virtual network interface can function as an endpoint for purposes of authenticating requests and otherwise managing customer traffic.

Various other applications, processes, and uses are presented below with respect to the various embodiments.

Figure 1:
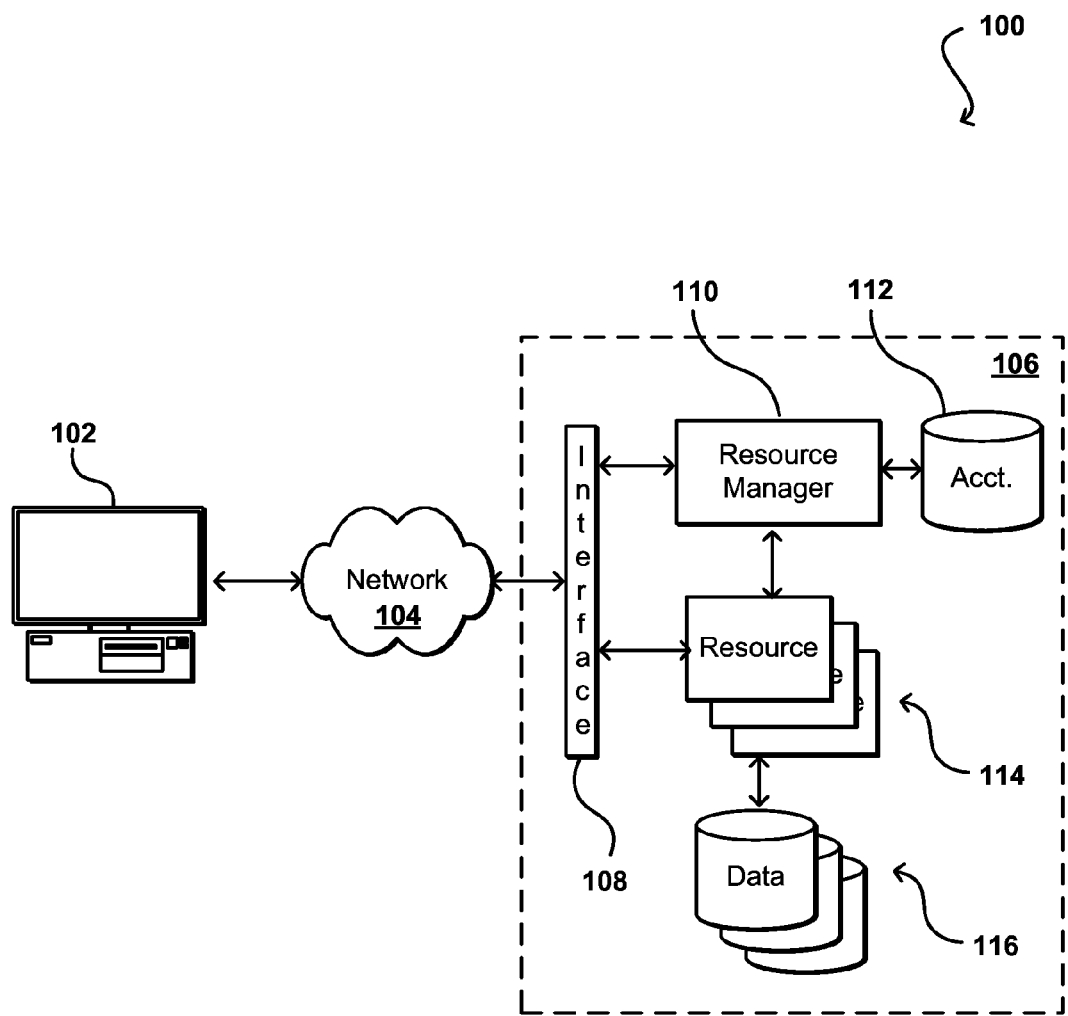
FIG. 1 illustrates an example environment in which various embodiments can be implemented.

FIG. 1 illustrates an example environment 100 in which aspects of the various embodiments can be implemented. In this example a customer of a multi-tenant environment 106 is able to utilize a client device 102 to submit requests across at least one network 104 to at least one designated address or interface of the multi-tenant environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The multi-tenant environment 106 can be supported and/or offered by a resource provider, and can include any appropriate components for receiving requests and returning information or performing actions in response to those requests. As an example, the environment might include Web servers and/or application servers for receiving and processing requests, then returning data, Web pages, video, audio, or other such content or information in response to the request. In many cases, the customer will have an account with the provider of the multi-tenant environment that indicates which resources or types of resources the customer can access, an amount of that access, types of tasks that can be performed with that access, or other such terms. One or more users might be associated with the customer, and thus can be able to access the resources per the customer account.

In various embodiments, the environment 106 may include various types of resources that can be utilized by multiple users for a variety of different purposes. In at least some embodiments, all or a portion of a given resource or set of resources might be allocated to a particular customer or allocated for a particular task, for at least a determined period of time. The sharing of these resources from a multi-tenant environment is often referred to as resource sharing, Web services, or "cloud computing," among other such terms and depending upon the specific environment and/or implementation. In this example the multi-tenant environment includes a plurality of resources 114 of one or more types. These types can include, for example, application servers operable to process instructions provided by a user or database servers operable to process data stored in one or more data stores 116 in response to a user request. As known for such purposes, the customer can also reserve at least a portion of the data storage in a given data store. Methods for enabling a customer to reserve various resources and resource instances are well known in the art, such that detailed description of the entire process, and explanation of all possible components, will not be discussed in detail herein.

In at least some embodiments, a user wanting to utilize at least a portion of the resources 114 can submit a request that is received to an interface layer 108 of the multi-tenant environment 106. The interface layer can include application programming interfaces (APIs) or other exposed interfaces enabling a user to submit requests to the multi-tenant environment. The interface layer 108 in this example can also include other components as well, such as at least one Web server, routing components, load balancers, and the like. When a request to provision a resource is received to the interface layer 108, for example, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account, or is associated with a customer having an existing account, with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user is not associated with a valid account with the provider, an associated account does not enable access to the type of resources specified in the request, or another such reason is preventing the user from obtaining access to such resources, a communication can be sent to the user (or associated customer) to enable the user to create or modify an account, or change the resources specified in the request, among other such options.

Once the user and/or request is authenticated, the account verified, and the resources allocated, the user can utilize the allocated resource(s) for the specified capacity, amount of data transfer, period of time, or other such metric. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, however, certain customers might want more assurance that requests received to the interface layer 108 of the multi-tenant environment 106 are properly authenticated such that valid requests for resources under a customer account are allowed, and modified or invalid requests purporting to be associated with the customer are rejected. For example, if a third party is able to obtain a copy of the credentials, such as a secure token, the third party can potentially generate requests that include those credentials and can obtain access to the resources associated with the customer account. Various other types of unauthorized or malicious requests can be received to the multi-tenant environment as well.

Accordingly, approaches in accordance with various embodiments can utilize a virtual private network (VPN) as a gateway or endpoint for customer communications. A virtual private network can enable a client device to connect to the multi-tenant environment in a way that is isolated from other computers or devices over an intermediate network, such as the Internet. From the perspective of the client device, the communications appear to pass directly from the client device to the multi-tenant environment as if the client device submitted a request directly to the appropriate interface (e.g., API) of the environment to perform a specific task. A VPN can provide a secure tunnel between the client device and the multi-tenant network that passes through the VPN, transparently to the client device in many cases.

Figure 2:
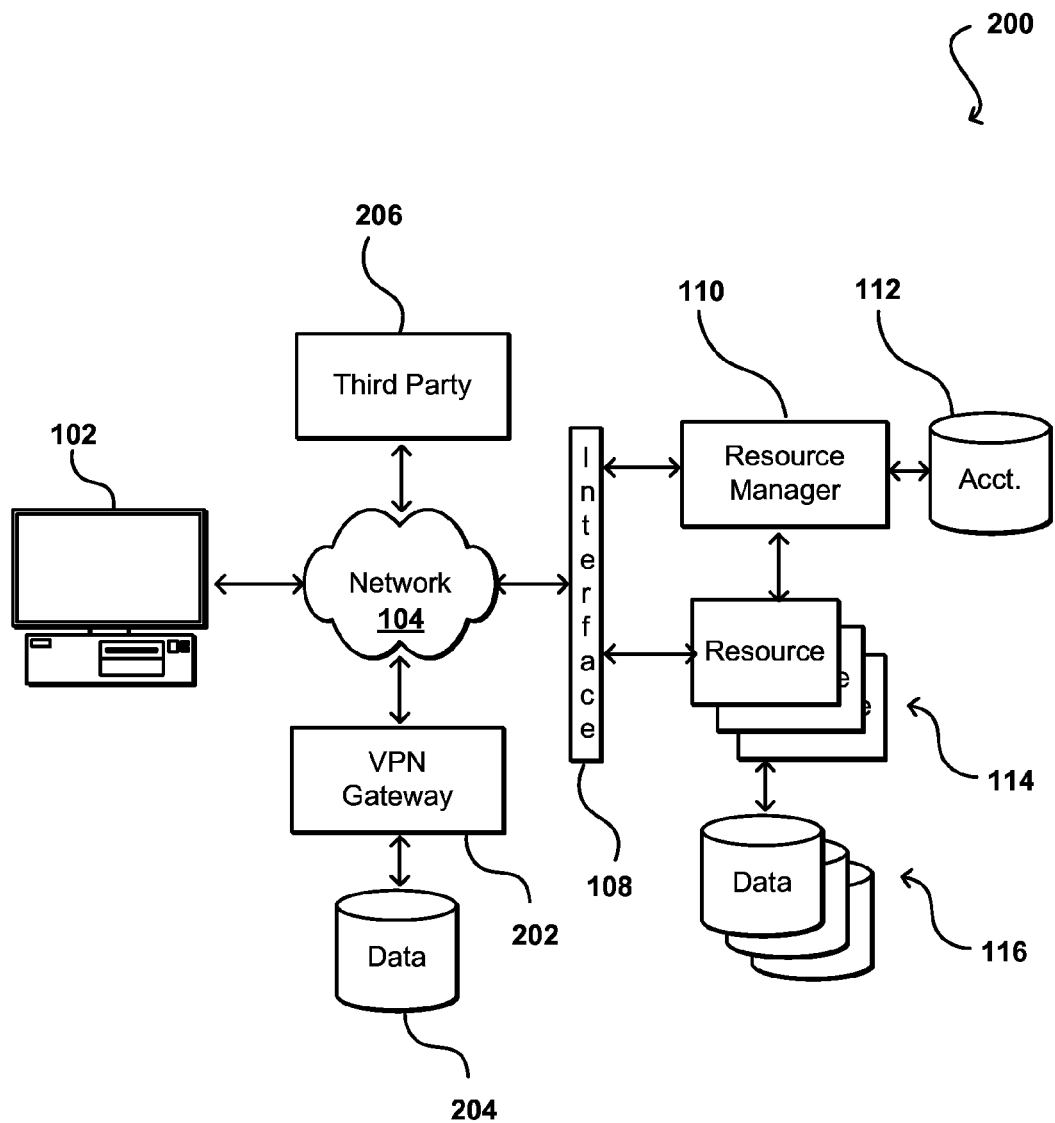
FIG. 2 illustrates an example configuration using a VPN gateway that can be used in accordance with various embodiments.

FIG. 2 illustrates an example configuration 200 that can be utilized in accordance with various embodiments. It should be understood that similar reference numbers may be carried over between figures for similar elements, in order to simplify explanation, but such usage should not be interpreted as a limitation on the scope of the various embodiments unless otherwise stated. In this example, a virtual private network (VPN) gateway 202 is utilized by the provider of the multi-tenant environment. The VPN gateway can sit within the multi-tenant environment, in a control plane associated with the environment, across at least one network, or in any other appropriate location. Further, the VPN gateway 202 can be provided by the provider of the multi-tenant environment or another provider, within the scope of the various embodiments.

In this example, the VPN gateway 202 is logically interposed between a client device 102 associated with a customer and the resources 114 of the multi-tenant environment. The VPN gateway can be configured to receive requests or communications from the client device 102 and perform various tasks on behalf of the customer and/or the provider. For example, the VPN gateway can accept and authenticate a connection and/or association with a customer. The gateway also can identify unsigned requests to one or more resources or services offered by via the multi-tenant environment, where those requests are received over an an established VPN security association or tunnel, among other such options. The gateway can also be configured to add data to unsigned requests that can identify the customer to the appropriate service and/or resource(s), as may be determined based at least in part upon the tunnel or channel over which a request was received. The VPN gateway can then forward the request or communication on to the appropriate interface (e.g., API) of the interface layer 108 of the multi-tenant environment, such that the components of the environment can validate and process the request. In at least some embodiments the data added to the unsigned requests can take the form of a signature associated with a customer account. The signature might be under a credential owned by the customer, or might relate to a delegation or permission from the customer as discussed in more detail elsewhere herein. In situations where the VPN gateway is outside the multi-tenant environment, there can be one or more secure channels between the gateway 202 and the environment, potentially between the gateway and the appropriate interface for the respective service and/or resource(s).

Such an approach can make it easier for customers to make strongly authenticated requests. A customer, or user associated with the customer, can connect to a VPN endpoint, such as one associated with a connection to the VPN gateway, where that connection is associated with an identity particular to that customer. The VPN gateway can then manipulate a request received over that connection to annotate the request with additional information useful for the stronger authentication. As mentioned, a signature associated with the customer can be added by the VPN, such that the customer does not have to be responsible for signing requests and does not have to maintain the information needed to sign the requests, or provide users with information needed to sign on the customer's behalf. In addition to adding a signature to a request, the VPN gateway can potentially include additional metadata indicating that the request was received over the appropriate connection. In some embodiments, information about an instance or device from which a request was made can also be added to the request, as well as information regarding the network over which the request was sent, the time of the connection, properties of the connection such as cryptographic strength or tunnel type, etc. This added information can then later be exposed for authorization. Such an approach enables a user to submit unsigned requests, which can then be signed by the VPN on behalf of the appropriate customer.

Similarly, a user can submit a signed request, which can then be enriched with additional security context by the VPN. This additional security context can be specified at least in part by the customer and/or the provider. For example, a customer might express one or more rules, which might be contained in a policy, that must be satisfied for a valid request, in order to provide a type of dual factor authentication. The policy can be used to evaluate whether a request came through a specific VPN gateway, for example. Further, the policy can be used to evaluate whether the proper types of information were added in a specific way, in addition to the values of that information being correct. Various other rules and/or rules languages can be used for this context.

Figure 3:
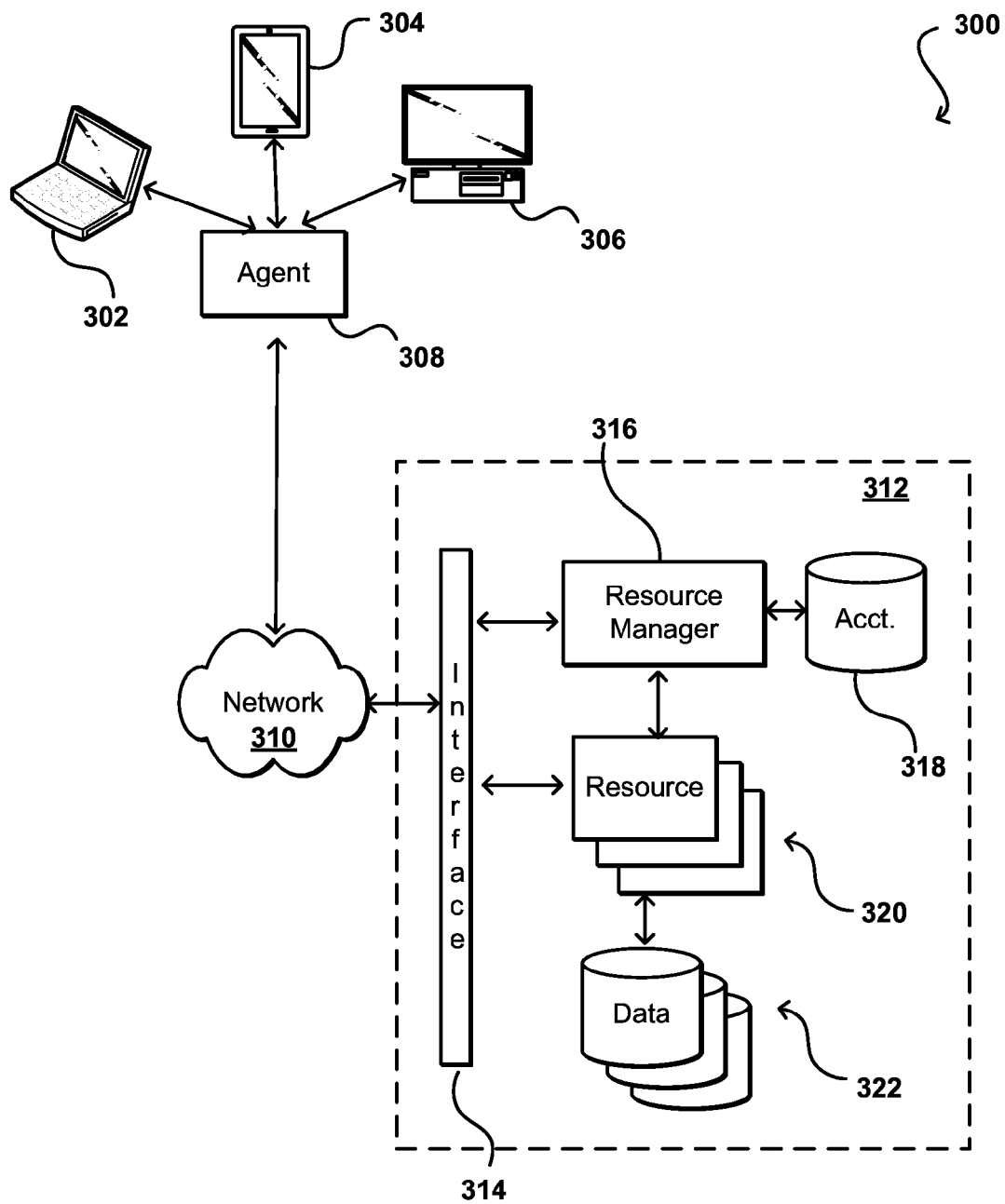
FIG. 3 illustrates an example configuration using an agent in a client environment that can be utilized in accordance with various embodiments.

FIG. 3 illustrates another example configuration 300 that can be used in accordance with various embodiments. In this example, at least some functionality similar to that discussed above with respect to a VPN gateway can alternatively be implemented as part of an agent 308 or other component, network, or virtual cloud that is located within a customer network 310. The agent 308 can be implemented in hardware and/or software, and can take the form of a physical or virtual device, among other such options. For example, the agent can be a VPN gateway within the customer environment. The agent 308 can serve as an endpoint for the customer environment 310, wherein authorized client devices 302, 304, 306 of different types can submit requests that are received by the agent 308. The devices can be configured to send the requests to the agent and specify an ultimate destination, or the agent can intercept the requests on the way to the destination and modify the request as needed. For example, the agent can proxy requests submitted by one of the client device 302, 304, 306 to be sent over at least one network 312 to a multi-tenant environment 314. The agent 308 can sign the request with the appropriate credentials for the customer, and can add any additional information useful for authentication as metadata in the request. In this example, the agent 308 may or may not be under any control of the provider of the multi-tenant environment. An advantage to such an implementation, at least from a customer standpoint, is that the customer retains control over the signing of customer-related requests, but does not have to provide the credentials or other information to the client devices 302, 304, 306 or various other components within the customer environment 310.

In some embodiments, the agent can be a dedicated device or appliance that connects to a VPN service provided by the multi-tenant environment. The agent can sign requests from the client environment and relay those messages for key or identity management, for example. In other embodiments, the agent can sign requests and send them to the appropriate endpoints of the multi-tenant environment, or can otherwise act as a secure proxy for the requests.

Figure 4:
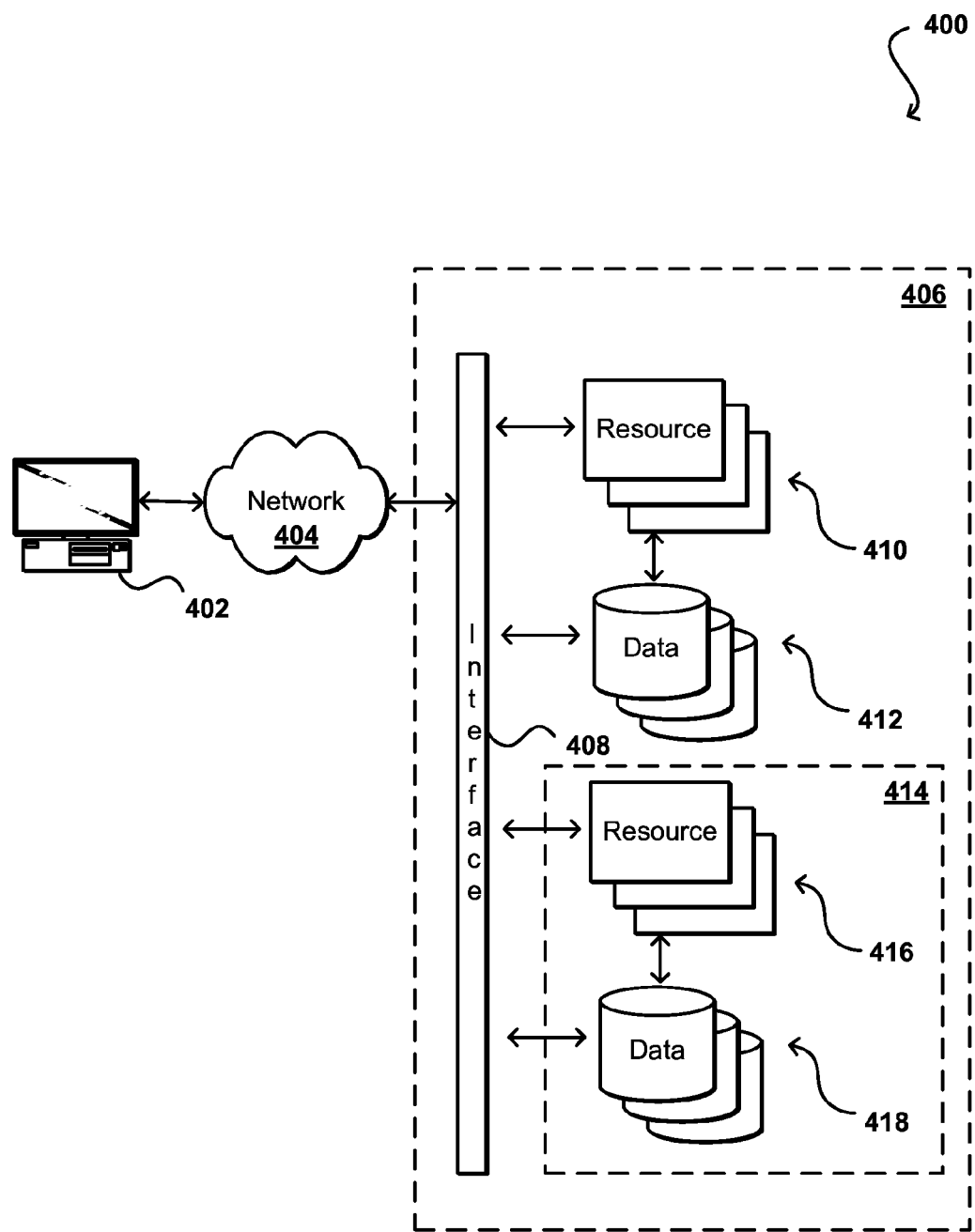
FIG. 4 illustrates an example configuration using a gateway for a private cloud that can be utilized in accordance with various embodiments.

FIG. 4 illustrates another example configuration 400 that can be utilized within the scope of the various embodiments. In this example, a customer has what will be referred to herein as a "private cloud" 414, or dedicated environment, within the multi-tenant environment. For the private cloud, a portion of the resources 410 and/or data stores 412 provided as part of the environment will be dedicated to use by the customer for at least a period of time, as determined by terms of the customer account with the provider. In at least some embodiments, the private cloud will appear to other resources 410 of the multi-tenant environment to be separate from, or otherwise outside, the multi-tenant environment. When a client device 402 associated with the customer submits a request across a network 404 to an interface 408 of the multi-tenant environment 406, the request will be authenticated and sent to the resources of the private cloud 414, such that from the customer perspective it will appear that the request is being sent not to a multi-tenant environment, but to a separate, dedicated environment under (at least partial) control of the customer. Approaches to providing dedicated access to at least a portion of one or more resources in a multi-tenant environment are known in the art and as such will not be discussed in detail herein.

In at least some embodiments, the private cloud 414 can include a gateway component 420 configured to function at least somewhat like the VPN gateway discussed above with respect to FIG. 2, but only for requests directed to the portion of the multi-tenant environment 406 dedicated to the private cloud 414 of the customer. The gateway or agent in this example can again be a device, appliance, or module operable to receive and modify requests received from a client device associated with a customer. In some embodiments, the agent can take the form of a virtual machine executing on a device of the multi-tenant environment. Because the agent is within the customer cloud, the agent can be at least partially under control of the customer. From the perspective of the portion of the multi-tenant environment outside the customer cloud, the agent might appear as a standard NAT gateway or other such component.

The VPC gateway 420 in the private cloud 414 for the customer can function as an endpoint operable to receive calls, signed or unsigned, with respect to services or resources offered through the private cloud. The endpoint can be exposed only via policy, rules, or other configuration or criteria to an instance or device associated with a particular customer. In some embodiments, a device on the premises of a customer, or otherwise associated with a customer, can also be established as an endpoint for communication with the private cloud. In at least some embodiments the device can be added as a virtual network interface card (NIC), HTTP proxy, or other such component with respect to the private cloud 414 or any other instance or resource within the multi-tenant environment 406. In some cases, the device can appear as an endpoint of the private cloud to which a user associated with the customer can send requests.

As discussed, requests processed by a gateway, agent, or other such component can be sent by a user or other entity associated with a customer. In some embodiments such a user might have full access to the resources or services under the customer account, while in other embodiments a user might have specific types or limits of access specified within the rights of the customer. For example, a customer might provider one or more delegation profiles that indicate a subset of rights to the resources, under the customer account, that the customer "delegates" to a specific user or group of users. Information about the delegation profile can be stored for a user or can be provided to a user, such that the user must submit an indication of the delegation profile with a request. When a request is received from a user, the appropriate delegation profile can be determined, if applicable, and the permissions that have been delegated to that user determined. If the user has delegated rights to have the request signed or otherwise modified, the agent or gateway can modify the request and forward the request to the appropriate resource, service, or endpoint. In at least some embodiments, information about the permissions might be included with metadata for the request.

As discussed, various other types of information can be added to the request as well. This can include information about the user or client machine associated with the request, information about the network or channel used to transmit the request, etc. The information can also include context about the customer resulting from identity federation. When a customer identity is verified, for example, the request can have information added that is specific to the customer's environment or context. In one example, a user might have a certificate issued specifically for that user or a device associated with that user, which would be inserted into the request by the gateway or agent. In such an instance, requests associated with that certificate can be tracked to the user and/or a user account.

In some embodiments the gateway or agent might also have an associated delegation profile, specifying tasks the gateway or agent may perform on behalf of the customer. This can include, for example, enabling a gateway to assert additional context about the user for which the request is being made. Such a mechanism can encode, within an account, that a particular gateway should have access to perform certain tasks in the account, and the permissions to associate with the requests.

In some embodiments, a specialized and/or dedicated routing proxy can attempt to determine whether a received request was formed as a proxy request or a direct request. The proxy can, in at least some embodiments, be configured to reject direct requests received to the proxy. One reason for the determination is that an HTTP client, for example, can send requests to an HTTP endpoint in one of two forms. The first form is directly to the endpoint, and these requests will typically have a host header identifying the endpoint as the target. It is easy to fool software systems into generating these requests in some cases, such as any time a service makes requests on behalf of its client. The other form is as a proxy where it is supposed to forward the request to a point beyond. These requests are more resilient to confused deputy attacks, and a proxy might choose to only act on requests sent to a point beyond.

Figure 5:
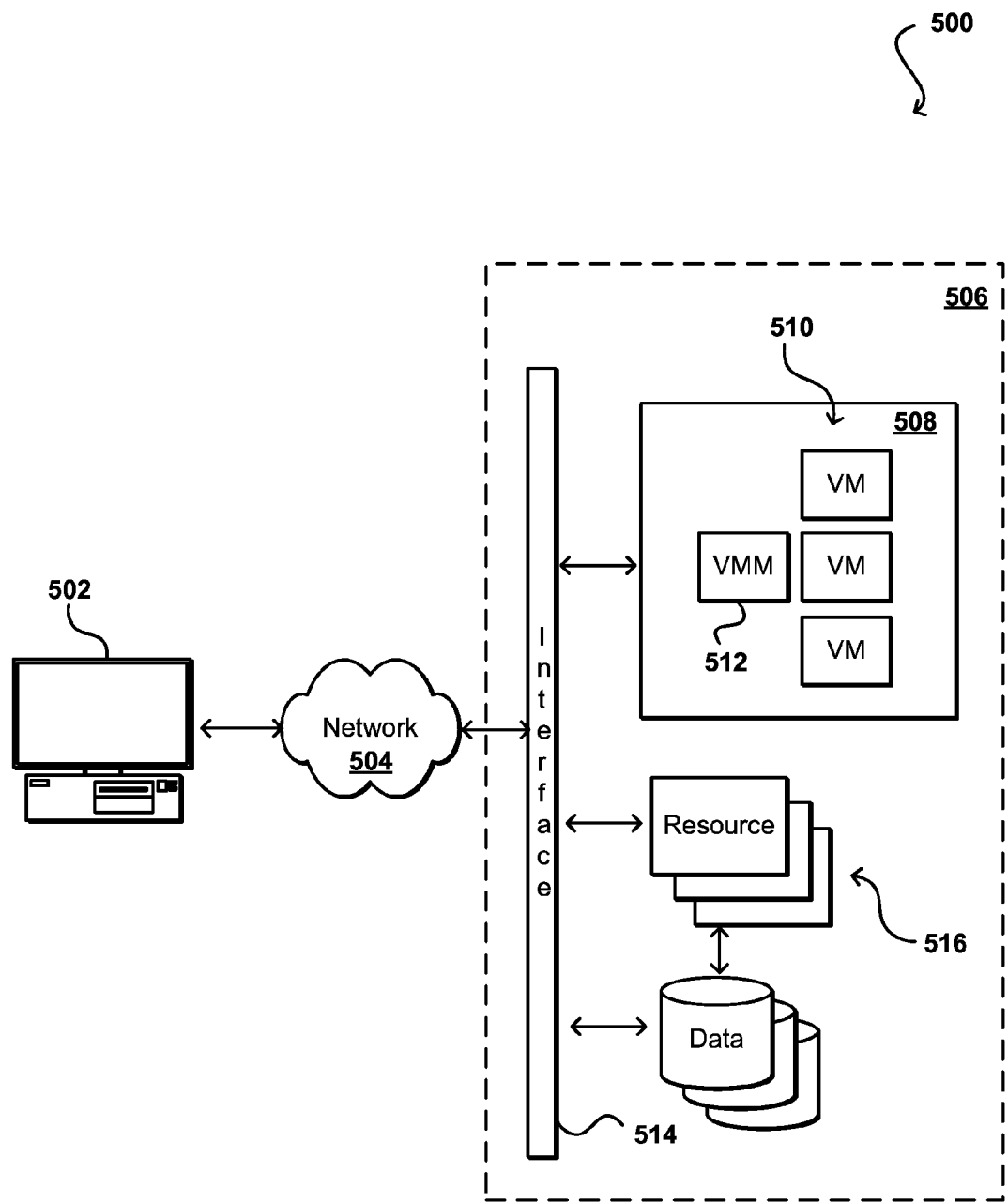
FIG. 5 illustrates an example configuration providing credential management through a virtual machine manager that can be utilized in accordance with various embodiments.

FIG. 5 illustrates another example configuration 500 that can be utilized in accordance with various embodiments. In this example, an endpoint can again be used to intercept traffic for a customer, in this case traffic directed to a specific API of the interface layer 514 of the multi-tenant environment. As illustrated, a client device 502 associated with a customer might submit a request across at least one network 504 to be received to a specific API of the multi-tenant environment that is associated with the customer. At least one resource 508, such as a server, in the multi-tenant environment can be configured to offer a service that is able to perform functionality such as that discussed above, in order to modify requests for a customer. There might be one or more virtual machines 510 (or machine instances) running on the resource 508, with those virtual machines 510 being managed by a virtual machine manager (VMM) 512, such as a hypervisor, running on the resource. In at least some embodiments, an instance or virtual machine executing on the resource 508 can expose an interface via one of a virtualized network interface card (NIC) or a specialized routing proxy for traffic interception. In some instances, this interface can be exposed to a guest system operating on a resource, such as to a Domain U (Dom U), etc.

The interface in at least some embodiments can intercept traffic directed to a particular API endpoint of the environment 506, where that endpoint may or may not be unique. The interception allows traffic passing through this interface to be distinguishable from other traffic received to the environment, as a request passing through the interface (and thus processed using a virtual machine manager 512 or other such component) can be signed, encapsulated, modified, or otherwise altered by the virtual machine manager 512. The modified request then can be forwarded to the appropriate destination. Such an approach has benefits in that it can be lower latency that using conventional approaches, and can utilize cheaper bandwidth. Further, such an approach can provide for authentication of the source of the traffic. In at least some embodiments, policies can be written requiring a specific instance or private cloud to be the source of a request, for example, instead of a potentially spoofable address (e.g., an IP address).

Such an approach enables functionality such as that described above for various VPN gateways and agents to be implemented at the virtual machine manager level. When resources are provisioned or allocated for a customer account, an unusuable IP address can be specified whereby a virtual machine manager can intercept any traffic directed to that IP address and modify the request appropriately. For example, the virtual machine manager can sign the request with the appropriate customer's credential, then forward the signed request to the appropriate destination. Such an approach can be beneficial, as the client device, customer instance, or other entity generating the request does not have to have access to the key or credential. The virtual machine manager can also insert strong context information as discussed above, that proves the request originated from the specific entity or source. It should be understood, however, that traffic received to such an interface can be intercepted and/or processed by other components in other locations as well, such as components in a control plane environment or otherwise outside an allocated machine or guest instance, etc.

In some embodiments, the security functionality can be provided using one or more additional virtual network interfaces, or other such interfaces, to which a user or customer can connect to transmit requests. These virtual interfaces can be exposed as endpoints to which traffic for a particular customer account can be directed. When traffic is received to one of these virtual interfaces, a designated component such as a virtual machine manager 512, or the interface itself in some situations, can sign or otherwise process the request and forward the request to the appropriate location. The virtualized interface can be implemented in some embodiments as a link or address on an existing network interface card, for example. The metadata added to a request can depend at least in part upon the virtual interface to which the request was received. In some situations a resource might have two network cards, a physical network card and a virtual network card dedicated to enhancing security. Requests for the customer that are sent to the physical network card will not be processed as they will not be properly signed or otherwise have the necessary credentials, but requests sent to the virtual NIC will be processed due to being modified to include the appropriate credentials. The requests can be identical other than the NIC to which the request was directed. The number of requests received to each interface, as well as the type and/or source of a request, among other such information, can be stored as well for future auditing and reconciliation. For example, an interface can emit data about which resources are used for a given user or customer, which can also be useful for metering. If a customer places the keys or credentials only in this interface, or other such agent/gateway, all account usage can flow through the interface and the interface can perform its own audio, which can be useful for reconciliation. If there are a fleet of such devices, then can each emit logs to an audit service, etc.

For customer instances running in the multi-tenant environment, those instances may never need to sign a request as those instances can instead direct requests to the appropriate interface whereby the requests will be signed, and can have additional security information included as necessary. Such an interface can be used with a virtual private cloud for a customer as well, as traffic for the private cloud can be routed specially anyway so routing to the interface can be specified through configuration. Such an approach can also be beneficial as it avoids training customers how to configure their egress filtering to allow their instances to communicate with specific resources and/or services, as such functionality can be provided via the interface. Such functionality also enables a customer to obtain stronger identity claims that a request actually came from a specific customer instance at a particular time.

In some embodiments the address for a signing and/or metadata service for a customer can be a distinct IP address, and the request can be disambiguated based at least in part upon the host header for the request. There can be a path within the metadata service, such as metadata service/storage, which enables a customer to issue calls to specific storage services even though the customer might not have signed the request in a way that is required to otherwise access those services. Such an endpoint can be described as an endpoint that does not require signing, or a software development kit (SDK) can wrap the request so an SDK can detect that the request came from a specific customer instance, etc., to determine how to properly route the request. The SDK thus can be configured to detect the interface and utilize it for request routing and processing. If the SDK was run on a third party system, for example, the SDK would send an unsigned request that would not get processed because there would be no virtual machine manager to insert the proper signature. In some embodiments, there can be policy filters over the users who can make requests, headers include in the requests, etc., and requests that appear to have been proxied or otherwise tampered with can be rejected.

Figure 6:
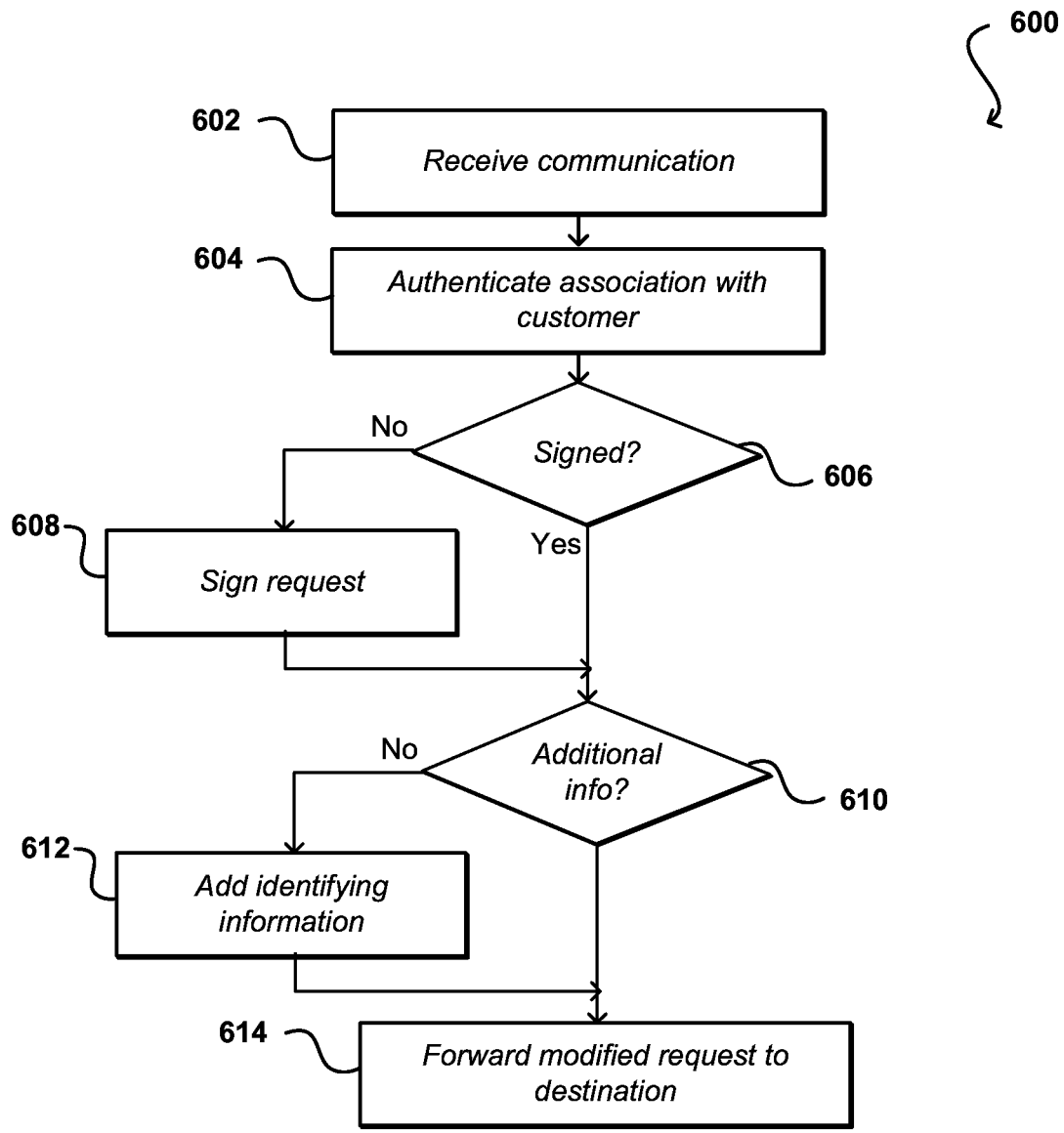
FIG. 6 illustrates an example process for managing credentials for requests associated with a customer of a multi-tenant environment that can be utilized in accordance with various embodiments.

FIG. 6 illustrates an example process 600 for managing credentials on behalf of a customer that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a communication is received 602 to an interface associated with a customer. As discussed, the interface can be provided using any of a number of different components, such as a network gateway, software agent, proxy server, virtual machine manager, virtual interface, and the like, which can sit in the customer environment, a multi-tenant environment, or elsewhere in various embodiments. An association of the communication with the customer can be authenticated 604, as may be determined by the environment of the interface, the channel over which the communication was received, header information for the communication, the address to which the communication was directed, and other such aspects. A determination is made 606 as to whether the request is properly signed for the destination or endpoint, as may be determined using a policy, ruleset, or other such determining factor. If not, the request can be signed 608 by the interface, or a component associated with the interface. Further a determination can be made 610 as to whether any additional information (e.g., identifying information) or credentials are to be added to the communication, as again may be determined by various rules or policies, etc. If so, the information or credentials can be added 612 to the communication. The modified request then can be forwarded 614 or otherwise directed to the intended or appropriate destination or endpoint. Various factors can be considered and functionality utilized in the various embodiments as discussed elsewhere herein.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIGS. 1 and 2. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java, C, C# or C++, or any scripting language, such as Perl, Python, or TCL, as well as combinations thereof. The server(s) may also include database servers, including without limitation those commercially available from Oracle®, Microsoft®, Sybase, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing credentials for a customer of a multi-tenant environment, comprising:
   receiving a communication to be delivered to a specified destination in a multi-tenant environment, the specified destination associated with at least one resource in the multi-tenant environment accessible under an account of a customer of the multi-tenant environment;
   authenticating an association of the communication with the customer;
   adding a signature to the communication, the signature based at least in part upon a credential associated with the customer;
   determining context information based at least in part upon a policy specified by the customer;
   inserting the context information in a metadata portion of the received communication to be delivered to the specified destination in the multi-tenant environment, the signature and the context information necessary for the communication to be determined to be a valid communication for purposes of accessing the at least one resource under the account of the customer; and
   forwarding the communication with the signature and the identifying information to the specified destination.

2. The computer-implemented method of claim 1, wherein the adding and the inserting is performed according to one or more permissions determined according to a delegation profile specified by the customer.

3. The computer-implemented method of claim 1, wherein authenticating the association includes at least one of determining a channel over which the communication was received, determining a location from which the communication was received, determining a network over which the communication was received, determining a time of connection of the channel, determining properties of the channel, or identifying specified information in the communication.

4. A computer-implemented method, comprising:
   receiving a communication to be delivered to an interface of a multi-tenant environment, the interface enabling access to one or more resources associated with a customer of the multi-tenant environment;
   authenticating an association of the communication with the customer;
   modifying the communication to include at least one of a credential or context information, the at least one of the credential or context information being required to authenticate the communication to access to the resources associated with the customer of the multi-tenant environment; and
   sending the communication after the modifying to the interface.

5. The computer-implemented method of claim 4, wherein the receiving, authenticating, modifying, and sending are performed by one of a virtual private network, a network gateway, a network interface card, a software agent, or a dedicated customer gateway.

6. The computer-implemented method of claim 4, wherein the receiving, authenticating, modifying, and sending are performed within a customer environment or within the multi-tenant environment.

7. The computer-implemented method of claim 4, wherein the communication is received from a client device associated with the customer or a user granted access to the one or more resources by the customer.

8. The computer-implemented method of claim 4, further comprising:
   denying the communication when the association of the communication with the customer is not authenticated.

9. The computer-implemented method of claim 4, wherein the communication is received over a secure tunnel between a client device and the interface of the multi-tenant environment.

10. The computer-implemented method of claim 4, wherein the communication is a Web service request and the interface is an application programming interface (API) associated with the one or more resources associated with the customer.

11. The computer-implemented method of claim 4, wherein at least one of an amount or a type of access granted to the customer against the one or more resources is determined by terms of an account of a customer with a provider of the multi-tenant environment.

12. The computer-implemented method of claim 11, wherein the receiving, authenticating, modifying, and sending are performed by a component granted permission according to a delegation profile specified by the customer, the permission falling within the terms of the account of the customer.

13. The computer-implemented method of claim 11, wherein modifying the communication includes signing the communication with a credential associated with the customer or the account of the customer.

14. The computer-implemented method of claim 4, wherein the interface is an endpoint of a virtual private network or dedicated cloud environment associated with the customer.

15. The computer-implemented method of claim 14, wherein a dedicated proxy receiving the communication is configured to determine whether the communication was formed as a proxy request or a direct request, the dedicated proxy being further configured to reject the communication if the communication was formed as a direct request.

16. The computer-implemented method of claim 4, wherein the communication when received is already signed by a credential associated with the customer, and wherein modifying the communication includes injecting additional security context into the communication.

17. The computer-implemented method of claim 4, wherein sending the communication after the modifying further comprises transmitting the communication over at least one of a communications channel or interface inaccessible to sender of the communication.

18. A computing device, comprising:
at least one device processor; and
memory including instructions that, when executed by the at least one device processor, enables the computing device to:
intercept a communication from a client device to be delivered to an interface of a multi-tenant environment, the interface enabling access to one or more resources associated with a customer of the multi-tenant environment;
determine that the communication is associated with the customer;
modify the communication by at least one of signing the communication with a credential or injecting identity information into the communication, the at least one signature or the identity information being required to access to the resources associated with the customer of the multi-tenant environment; and
forward the communication after the modifying to the interface.

19. The computing device of claim 18, wherein the communication is received over a secure tunnel between a client device and the interface of the multi-tenant environment.

20. The computing device of claim 18, wherein at least one of an amount or a type of access granted to the customer against the one or more resources is determined by terms of an account of a customer with a provider of the multi-tenant environment, and wherein the computing device granted permission for the modifying according to a delegation profile specified by the customer, the permission falling within the terms of the account of the customer.

21. The computing device of claim 18, wherein determining that the communication is associated with the customer includes at least one of determining a channel over which the communication was received, determining a location from which the communication was received, determining a network over which the communication was received, determining a time of connection of the channel, determining properties of the channel, or identifying specified information in the communication.

22. The computing device of claim 18, wherein the computing device comprises at least a virtual private network adapter, a network gateway, a network interface card, or a dedicated customer gateway.

23. A non-transitory computer-readable storage medium including instructions that, when executed by at least one processor of a computing device, cause the computing device to:
intercept a communication from a client device to be delivered to an interface of a multi-tenant environment, the interface enabling access to one or more resources associated with a customer of the multi-tenant environment;
authenticate an association of the communication with the customer;
modify the communication by at least one of signing the communication with a credential or injecting identity information into the communication, the at least one signature or identity information being required to access to the resources associated with the customer of the multi-tenant environment authenticate the communication to the interface of the multi tenant environment; and
forward the communication after the modifying to the interface.

24. The non-transitory computer-readable storage medium of claim 23, wherein the instructions when executed further enable the system to:
deny the communication when the association of the communication with the customer is not authenticated.

25. The non-transitory computer-readable storage medium of claim 23, wherein the instructions when executed further enable the system to:
determine one or more permissions for modifying the communication based at least in part upon a delegation profile specified by the customer.

26. The non-transitory computer-readable storage medium of claim 23, wherein authenticating the association includes at least one of determining a channel over which the communication was received, determining a location from which the communication was received, determining a network over which the communication was received, determining a time of connection of the channel, determining properties of the channel, or identifying specified information in the communication.

* * * * *